US012233733B2

United States Patent
Lieberman

(10) Patent No.: US 12,233,733 B2
(45) Date of Patent: Feb. 25, 2025

(54) ELECTRIFIED VEHICLE CHARGING STATION CONFIGURED TO PROVIDE PARKING GUIDANCE TO ELECTRIFIED VEHICLES

(71) Applicant: Ford Global Technologies, LLC, Dearborn, MI (US)

(72) Inventor: Colin Turner Lieberman, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 878 days.

(21) Appl. No.: 17/116,025

(22) Filed: Dec. 9, 2020

(65) Prior Publication Data

US 2022/0176839 A1 Jun. 9, 2022

(51) Int. Cl.
*B60L 53/36* (2019.01)
*B60L 53/16* (2019.01)
(Continued)

(52) U.S. Cl.
CPC ............ *B60L 53/36* (2019.02); *B60L 53/16* (2019.02); *B60L 53/18* (2019.02); *B60L 53/66* (2019.02); *B60W 30/02* (2013.01); *B60W 60/001* (2020.02)

(58) Field of Classification Search
CPC .......... B60L 53/36; B60L 53/66; B60L 53/30; B60L 53/50; B60L 53/35; B60L 53/34; B60L 53/31; B60L 53/55; B60L 2200/10; B60L 53/00; B60L 53/10; B60L 53/11; B60L 53/12; B60L 53/126; B60L 53/14; B60L 53/16; B60L 53/18; B60L 53/20; B60L 53/22; B60L 53/24; B60L 53/302; B60L 53/305; B60L 53/32; B60L 53/37; B60L 53/38; B60L 53/39; B60L 53/51; B60L 53/52; B60L 53/53; B60L 53/54; B60L 53/56; B60L 53/57; B60L 53/60; B60L 53/62; B60L 53/63; B60L 53/64; B60L 53/65; B60L 53/665; B60L 53/67; B60L 53/68; B60L 53/80; B60L 2260/32; H02J 50/10; H02J 7/0045; H02J 7/345;
(Continued)

(56) References Cited

U.S. PATENT DOCUMENTS 8,338,991 B2 12/2012 Von Novak et al.
9,114,720 B2 8/2015 Oman et al.
(Continued)

FOREIGN PATENT DOCUMENTS

DE 102015200018 A1 7/2016
WO 2015039797 A1 3/2015
WO 2015051876 A1 4/2015

*Primary Examiner* — Hunter B Lonsberry
*Assistant Examiner* — Jalal C Coduroglu
(74) *Attorney, Agent, or Firm* — David B. Kelley; Carlson, Gaskey & Olds, P.C.

(57) ABSTRACT

An electrified vehicle charging station according to an exemplary aspect of the present disclosure includes, among other things, a charger assembly including a plug connected to a terminal via a charger cable, and a transceiver configured to communicate information to an electrified vehicle which is useable to guide the electrified vehicle to an acceptable parking position. The acceptable parking position is a position in which the plug will reach a charging port of the electrified vehicle. A method is also disclosed.

20 Claims, 3 Drawing Sheets

(51) Int. Cl.
  *B60L 53/18* (2019.01)
  *B60L 53/66* (2019.01)
  *B60W 30/02* (2012.01)
  *B60W 60/00* (2020.01)

(58) Field of Classification Search
  CPC ... H02J 2310/48; H02J 7/00034; B64F 1/362; B60W 30/02; B60W 60/001; B60W 30/06
  See application file for complete search history.

(56) References Cited

U.S. PATENT DOCUMENTS

| | | | |
|---|---|---|---|
| 10,177,593 B2 | 1/2019 | Turner et al. | |
| 2003/0236601 A1* | 12/2003 | McLeod | B60L 58/12 701/31.4 |
| 2005/0134440 A1* | 6/2005 | Breed | G01S 17/931 701/45 |
| 2009/0079388 A1* | 3/2009 | Reddy | G06Q 40/12 320/109 |
| 2013/0029595 A1 | 1/2013 | Widmer et al. | |
| 2013/0090936 A1* | 4/2013 | Solomon | G06Q 30/02 705/1.1 |
| 2013/0157485 A1* | 6/2013 | Yamamaru | B60K 15/04 174/67 |
| 2014/0142770 A1* | 5/2014 | Sellschopp | B60L 58/12 700/291 |
| 2015/0042278 A1* | 2/2015 | Leary | B60L 1/02 901/30 |
| 2015/0151644 A1* | 6/2015 | Nakajima | B60K 1/04 320/109 |
| 2016/0376031 A1* | 12/2016 | Michalski | G08G 5/025 701/15 |
| 2017/0144559 A1* | 5/2017 | Kees | B60L 53/66 |
| 2017/0225578 A1* | 8/2017 | Paryani | B60L 53/36 |
| 2018/0086219 A1* | 3/2018 | Malek | B60L 53/16 |
| 2018/0154866 A1* | 6/2018 | Sute | H02J 50/12 |
| 2019/0054829 A1* | 2/2019 | Seong | A61N 1/37229 |
| 2019/0118662 A1* | 4/2019 | Anzicek | B60L 53/14 |
| 2019/0162792 A1* | 5/2019 | Neubecker | G06F 1/3215 |
| 2019/0184841 A1* | 6/2019 | Van Wiemeersch | B60L 53/38 |
| 2020/0094700 A1* | 3/2020 | Hui | B60L 53/60 |
| 2020/0101849 A1* | 4/2020 | Ghabra | G06K 19/0723 |
| 2020/0139836 A1* | 5/2020 | Sato | B60L 53/35 |
| 2020/0185930 A1* | 6/2020 | Kuwata | H01L 29/2003 |
| 2020/0198489 A1* | 6/2020 | Yoon | B60L 58/12 |
| 2020/0311641 A1* | 10/2020 | Noguchi | G08G 1/146 |
| 2020/0346553 A1* | 11/2020 | Grimm | B60L 53/65 |
| 2021/0276433 A1* | 9/2021 | Mandel-Senft | B60L 53/305 |
| 2021/0356279 A1* | 11/2021 | Szigeti | G01C 21/3407 |
| 2021/0387346 A1* | 12/2021 | Gillett | B25J 19/0075 |
| 2022/0024330 A1* | 1/2022 | Books | B60L 53/57 |
| 2022/0055495 A1* | 2/2022 | Labell | B60L 53/37 |
| 2022/0176839 A1* | 6/2022 | Lieberman | B60L 53/16 |

* cited by examiner

ELECTRIFIED VEHICLE CHARGING STATION CONFIGURED TO PROVIDE PARKING GUIDANCE TO ELECTRIFIED VEHICLES

TECHNICAL FIELD

This disclosure relates to an electrified vehicle charging station configured to provide parking guidance to electrified vehicles.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery of a plug-in electrified vehicle may be charged at public or private electrified vehicle charging stations, for example. Plug-in electrified vehicles include a charging port configured to couple to a plug of the electrified vehicle charging station. When the plug is coupled to the charging port, the electrified vehicle charging station may charge the traction battery.

SUMMARY

An electrified vehicle charging station according to an exemplary aspect of the present disclosure includes, among other things, a charger assembly including a plug connected to a terminal via a charger cable, and a transceiver configured to communicate information to an electrified vehicle which is useable to guide the electrified vehicle to an acceptable parking position. The acceptable parking position is a position in which the plug will reach a charging port of the electrified vehicle.

In a further non-limiting embodiment of the foregoing electrified vehicle charging station, the acceptable parking position is a location and orientation of the electrified vehicle in which the plug can reach the charging port and in which the electrified vehicle does not block access to any other charger assemblies of the electrified vehicle charging station.

In a further non-limiting embodiment of any of the foregoing electrified vehicle charging stations, the plug is configured to receive power from an external power source and deliver power to a battery pack of the electrified vehicle via the charging port.

In a further non-limiting embodiment of any of the foregoing electrified vehicle charging stations, the information includes a virtual map indicating an acceptable port location.

In a further non-limiting embodiment of any of the foregoing electrified vehicle charging stations, the acceptable port location is based on a length of the charger cable.

In a further non-limiting embodiment of any of the foregoing electrified vehicle charging stations, the acceptable parking position is determined by comparing the location of the charging port on the electrified vehicle, the size and shape of the electrified vehicle, and the acceptable port location.

In a further non-limiting embodiment of any of the foregoing electrified vehicle charging stations, the virtual map includes a location of an obstruction adjacent the charger assembly.

In a further non-limiting embodiment of any of the foregoing electrified vehicle charging stations, the transceiver is configured to send and receive information relative to the electrified vehicle such that the electrified vehicle can autonomously maneuver to the acceptable parking position.

In a further non-limiting embodiment of any of the foregoing electrified vehicle charging stations, the transceiver is configured to send and receive information relative to a plurality of transceivers of the electrified vehicle.

In a further non-limiting embodiment of any of the foregoing electrified vehicle charging stations, the plurality of transceivers of the electrified vehicle include transceivers of a passive entry system of the electrified vehicle.

In a further non-limiting embodiment of any of the foregoing electrified vehicle charging stations, a current location of the electrified vehicle is determined using at least one of time-of-flight, angle-of-arrival, or RSSI-based measurements.

In a further non-limiting embodiment of any of the foregoing electrified vehicle charging stations, the charger assembly includes a movable supporting the plug and configured to move the plug relative to the charging port.

In a further non-limiting embodiment of any of the foregoing electrified vehicle charging stations, the moveable arm is configured to move in a vertical direction perpendicular to a ground surface, the moveable arm also translatable in a direction perpendicular to the vertical direction toward and away from the charging port, and the moveable arm is not moveable in a horizontal direction.

In a further non-limiting embodiment of any of the foregoing electrified vehicle charging stations, the electrified vehicle charging station includes a controller configured to receive information from components of the electrified vehicle charging station and configured to issue commands to components of the electrified vehicle charging station.

In a further non-limiting embodiment of any of the foregoing electrified vehicle charging stations, the electrified vehicle is one of a battery electric vehicle and a plug-in hybrid electric vehicle, and the electrified vehicle includes a battery pack configured to output electrical power to an electric machine.

A method according to an exemplary aspect of the present disclosure includes, among other things, communicating information to an electrified vehicle. The information is useable to guide the electrified vehicle to an acceptable parking position in which a plug of an electrified vehicle charging station will reach a charging port of the electrified vehicle.

In a further non-limiting embodiment of the foregoing method, the information includes a virtual map including acceptable port locations and obstructions associated with the electrified vehicle charging station.

In a further non-limiting embodiment of any of the foregoing methods, the method includes autonomously maneuvering the electrified vehicle to the acceptable parking position using the information.

In a further non-limiting embodiment of any of the foregoing methods, the autonomously maneuvering step includes receiving information from a transceiver of the electrified vehicle regarding a location of the electrified vehicle.

In a further non-limiting embodiment of any of the foregoing methods, the method includes, when the electrified vehicle is parked in the acceptable parking position, plugging the plug into the charging port either manually or using a moveable arm.

DETAILED DESCRIPTION

This disclosure relates to an electrified vehicle charging station configured to provide parking guidance to electrified vehicles. An example electrified vehicle charging station includes a charger assembly including a plug connected to a terminal via a charger cable, and a transceiver configured to communicate information to an electrified vehicle which is useable to guide the electrified vehicle to an acceptable parking position. The acceptable parking position is a position in which the plug will reach a charging port of the electrified vehicle. Among other benefits, which will be appreciated from the below description, this disclosure takes advantage of the known benefits of conductive, cabled (e.g., hard-wired) charger assemblies, namely charging speed, while efficiently guiding vehicles into an acceptable parking position, thereby eliminating the frustration associated with situations where one parks outside the reach of a cabled charger assembly and needs to re-position their vehicle. Further, in some circumstances, one parked outside the intended reach of a cabled assembly may still attempt to plug the plug of the charger assembly into the vehicle, which can apply undue tension onto a charger cable. With this disclosure, the lifespan of the equipment of the electrified vehicle charging station is extended by ensuring vehicles are parked such that the plug can reach the charging port without applying undue tension onto the charger cable.

Figure 1:
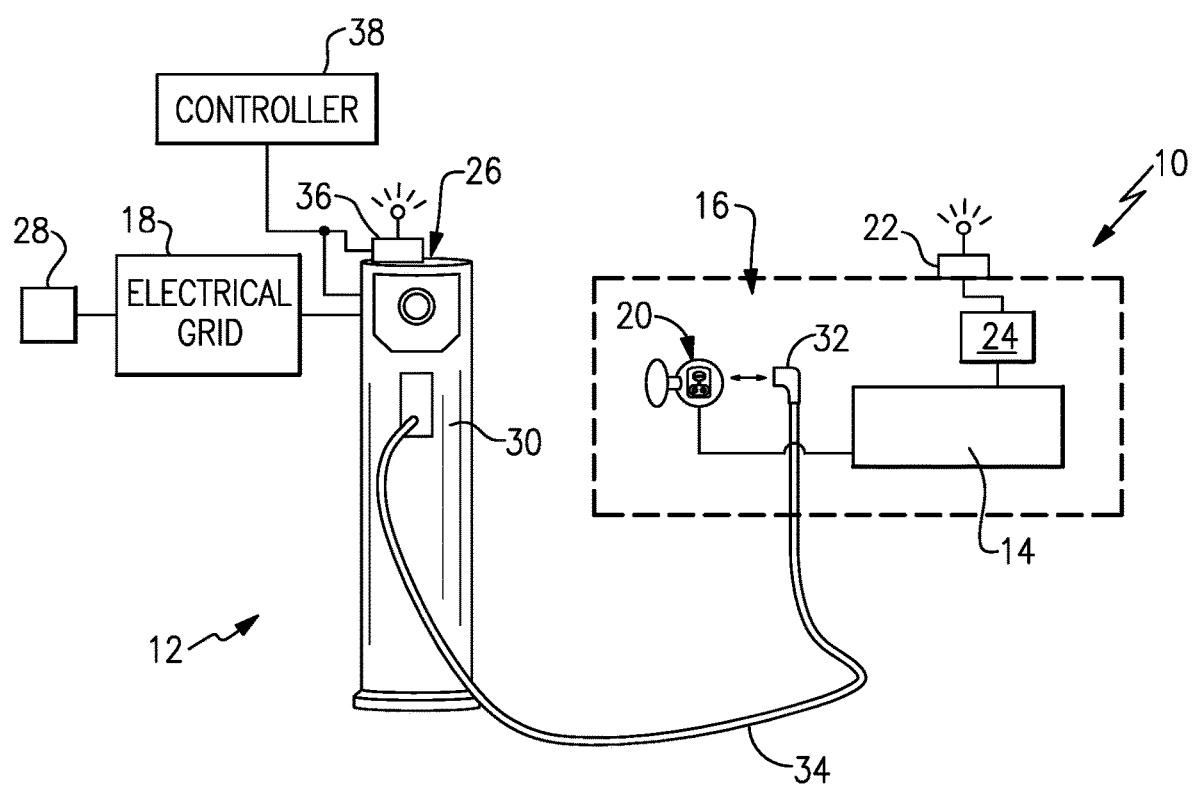
FIG. 1 schematically illustrates an electrified vehicle and an electrified vehicle charging station.

FIG. 1 schematically illustrates an electrified vehicle 10 and an electrified vehicle charging station 12 ("charging station 12"). In an example of this disclosure, the electrified vehicle 10 is a battery electric vehicle (BEV). It should be understood, however, that the concepts described herein are not limited to BEVs and could extend to other electrified vehicles, including other plug-in electrified vehicles such as plug-in hybrid electric vehicles (PHEVs). Therefore, the electrified vehicle 10 could be equipped with an internal combustion engine that can be employed either alone or in combination with other energy sources to propel the electrified vehicle 10.

In a non-limiting embodiment, the electrified vehicle 10 is a full electric vehicle propelled solely through electric power, such as by an electric machine, without any assistance from an internal combustion engine. The electric machine may operate as an electric motor, an electric generator, or both. The electric machine receives electrical power from a battery pack 14 and provides a rotational output power, which ultimately drives wheels of the electrified vehicle 10. In an embodiment, a high voltage bus electrically connects the electric machine to the battery pack 14 through an inverter.

The battery pack 14 is an energy storage device and, in this example, is an exemplary electrified vehicle battery. The battery pack 14 may be referred to as a traction battery or simply a "battery." The battery pack 14 may be a high voltage traction battery pack that includes a plurality of battery assemblies (i.e., battery arrays or groupings of battery cells) capable of outputting electrical power to operate the electric machine and/or other electrical loads of the electrified vehicle 10. Other types of energy storage devices and/or output devices can also be used to electrically power the electrified vehicle 10.

The electrified vehicle 10 also includes a charging system 16 for periodically charging the cells of the battery pack 14. The charging system 16 may be connected to an external power source, such as an electrical grid 18, for receiving and distributing power to the cells. In one non-limiting embodiment, the charging system 16 includes an interface, which in this example is a charging port 20 located on-board the electrified vehicle 10. The charging port 20 could be designed to interface with one or more standardized charge couplers, such as SAE J1772 Type 1, CCs, or CHAdeMO connectors. The charging port 20 is adapted to selectively receive power from an external power source, such as from a power cable connected to the external power source, and then distribute the power to the battery pack 14 for charging the cells.

One example external power source includes the electrified vehicle charging station 12. In an example, the electrified vehicle charging station 12 is a publicly available electrified vehicle charging station. In another example, the electrified vehicle charging station 12 is private, such as those at homes or businesses. The charging port 20 may be configured to mechanically and electrically couple to a plug supplying alternating current (AC) power or a plug supplying direct current (DC) power. In this regard, the charging system 16 may be equipped with power electronics used to convert AC power received from an external power supply to DC power for charging the cells of the battery pack 14. The charging system 16 may also include a DC-to-DC converter in some examples.

The electrified vehicle 10 also includes at least one transceiver 22. The transceiver 22 is configured to send and receive communications and signals relative to the electrified vehicle 10. The transceiver 22 may be one of a plurality of transceivers arranged about the electrified vehicle 10. For instance, in the example of FIG. 2, the electrified vehicle 10 includes eight transceivers 22A-22H arranged about the perimeter of the electrified vehicle 10. The transceiver 22 may be part of a passive entry system of the electrified vehicle 10 or may be a ultra-wideband (UWB) transceiver. In this regard, the transceiver 22 is responsive to a keyfob or other recognized device, such as a phone or mobile device, entering an area adjacent the electrified vehicle 10. The transceiver 22 may also receive commands from a controller 24 of the electrified vehicle 10 regarding the type of information to transmit. Further, the transceiver 22 is configured to relay received information to the controller 24. The transceiver 22 may also be electrically connected to one or more remote servers.

The charging station 12 is configured to transfer power to the electrified vehicle 10 to charge the battery pack 14. The charging station 12 includes two charger assemblies 26, 28, in this example. The charging station 12 could include one charger assembly, such as when the charging station 12 is a private charging station, or could include more than two charger assemblies, such as in the example where the charging station 12 is a public charging station. In another example, the charging station 12 does not include any charger assemblies, and instead includes other electric vehicle supply equipment (EVSE) such as J1772 Level 1 or Level 2 AC charging installations. In those examples, the charger assembly is onboard the electrified vehicle 10.

The charger assembly 26 is shown in greater detail than the charger assembly 28, which is shown only schematically but in practice would be arranged substantially similar to the charger assembly 26. The charger assembly 26 is a conductive charger assembly. In particular, the charger assembly 26 is a cabled charger assembly 26 and is electrically coupled to the electrical grid 18, which is a grid power source. The charger assembly 26 conveys power from the electrical grid 18 to the electrified vehicle 10. In this example, the charger assembly 26 includes a terminal 30, a plug 32, and a charger cable 34 between the terminal 30 and the plug 32. The plug 32 may have a standard plug configuration, such as a J plug or SAE J1772 plug configuration, corresponding to that of the charging port 20.

The charger assembly 26 further includes at least one transceiver 36, in this example. While only one transceiver is shown in FIG. 1, the charger assembly 26 may include additional transceivers. For instance, in the example of FIG. 2, the charger assembly 26 includes two transceivers 36A, 36B. The transceiver 36 is configured to send and receive communications and signals relative to the charging station 12. The charging station 12 also includes a controller 38, in this example. The controller 38 is configured to receive information from the transceiver 36, and is further configured to relay information to the transceiver 36, which in turn is configured to send that information to an appropriate destination, such as to the electrified vehicle 10.

The charging station 12 may be referred to as an electric vehicle charging station, an EV charging station, an electric recharging point, a charging point, a charge point, an electronic charging station (ECS), or EVSE. As the charging station 12 includes a number of components, the charging station 12 may be referred to as a system. In this disclosure, the system may be inclusive of electrified vehicles, such as electrified vehicle 10, including those electrified vehicles that are arriving at the charging station 12, departing the charging station 12, or actively using the charging station 12.

The controller 24 is programmed with executable instructions for interfacing with and operating the various components of the electrified vehicle 10, and the controller 38 is programmed with executable instructions for interfacing with and operating the various components of the charging station 12. The controller 24 could be part of an overall vehicle control module, such as a body control module (BCM) or vehicle system controller (VSC), or could alternatively be a stand-alone controller separate from the BCM or VSC. The controllers 24, 38 each include hardware, software, a processing unit, and non-transitory memory.

This disclosure pertains to charging stations having cabled charger assemblies. Cabled charger assemblies are those that form a tethered, hard-wired connection between an electrified vehicle 10 and the charging station 12. This disclosure does not extend to charging stations that use wireless power transfer, such as inductive charging systems. As such, the charging station 12 does not experience the inefficiencies associated with wireless power transfer systems. The charging station 12 can charge the battery pack 14 faster than wireless power transfer systems, and in some examples can provide DC Fast Charging. Further, the charging station 12 does not require relatively expensive wireless power transfer hardware to be installed on an electrified vehicle.

Much of the hardware associated with the charging station 12 is fixed and immovable. Thus, in order to transfer power to the electrified vehicle 10, the electrified vehicle 10 must be parked such that the plug 32 can reach the charging port 20. In particular, the electrified vehicle 10 must be located in a particular location, and oriented in a particular direction, such that the plug 32 can reach the charging port 20. The reach of the plug 32 is limited by the length of the charger cable 34. While the charger cable 34 can be of any length, there is added weight, cost, and inefficiencies to increased length. A balance of design tradeoffs must be struck relative to the length of the charger cable 34. Using the present disclosure, which provides guidance to electrified vehicles as to where they should park, a relatively short charger cable 34 can be used without experiencing many of the issues commonly associated with relatively short charger cables, such users having difficulty reaching the plug to the charging port and needing to re-park, or users applying too much tension to the short charger cable when they are not parked in a proper position, as examples.

Charging the electrified vehicle 10, for example, using the charging station 12 involves positioning the electrified vehicle 10 near the charging station 12 and electrically coupling the plug 32, for example, to the electrified vehicle 10 via charging port 20. Power can then move from the electrical grid 18 to the electrified vehicle 10, and specifically to the battery pack 14. The battery pack 14 can be charged when the electrified vehicle 10 is in this charging position.

Figure 2:
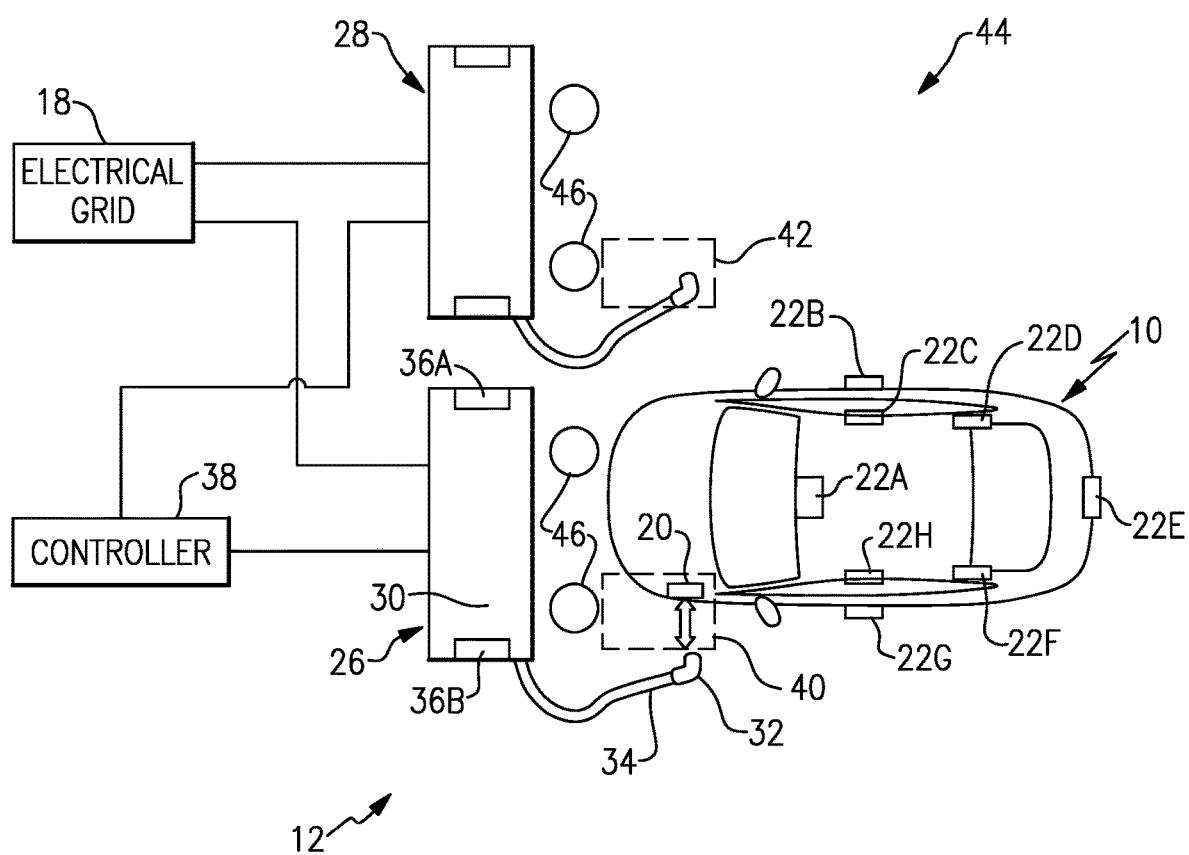
FIG. 2 is a top view of an electrified vehicle in an acceptable parking position relative to an electrified vehicle charging station, which includes conductive charger assemblies.

This disclosure increases the ease and efficiency with which an electrified vehicle 10 can be parked in a position where the electrified vehicle 10 can be charged. In particular, this disclosure reduces confusion over whether a user has parked his or her electrified vehicle 10 within a reach of the plug 32. With reference to FIG. 2, in this disclosure, there are a number of predefined acceptable port locations 40, 42 (FIG. 2), with one acceptable port location 40, 42 adjacent a respective one of the charger assemblies 26, 28. The acceptable port locations 40, 42 may be geofences. The acceptable port locations 40, 42 are three-dimensional spaces adjacent a charger assembly 26, 28 where a plug of the respective charger assembly can reach. For instance, the acceptable port location 40 is a three-dimensional space where the plug 32 can reach a port, such as the charging port 20, if the charging port 20 is within that three-dimensional space. The acceptable port location 40 is determined, in part, based on a position of the terminal 30 and a length of the charger cable 34. The acceptable port locations 40, 42 are stored and saved on the controller 38.

In order to facilitate parking of electrified vehicles such that their ports are within the acceptable port locations 40, 42, the charging station 12 is configured to send and/or receive information relative to electrified vehicles approaching the charging station 12 regarding how the approaching vehicles need to park such that their charging ports will be within the acceptable port locations 40, 42 and such that they do not block other vehicles from accessing other acceptable port locations 40, 42. As will be explained below, information from the charging station 12 is useable by the approaching electrified vehicles 10, or vice versa, in maneuvering the electrified vehicles 10 to an acceptable parking position. In this disclosure, an acceptable parking position includes both an acceptable vehicle location and an acceptable vehicle orientation. In particular, an acceptable parking position is a location and orientation within a parking area 44 adjacent the charging station 12 where the electrified vehicle 10 should park such that the charging port 20 of the electrified vehicle 10 is within one of the acceptable port locations 40, 42 and such that the electrified vehicle 10 does not block other vehicles from accessing other acceptable port locations 40, 42.

When providing parking guidance to electrified vehicles approaching the charging station 12, other information, beyond the acceptable port locations 40, 42, is transmitted in some examples. Example additional information includes whether there are any temporary or fixed obstructions, such as curbs or bollards 46, adjacent the charging station 12, and whether any other electrified vehicles are currently within a parking area 44 and the location(s) of those other vehicles. Further, the electrified vehicle 10 may transmit to the charging station 12 additional information, such as the location of the charging port 20 on the electrified vehicle 10, as well as the size and shape of the electrified vehicle 10.

In FIG. 2, the electrified vehicle 10 is parked in an acceptable parking position. In particular, in the example of FIG. 2, the charging port 20 is arranged adjacent the front driver side of the electrified vehicle 10. Thus, the electrified vehicle 10 is parked facing forward, toward the charger assembly 26, and the charging port 20 is within the acceptable port location 40 such that the plug 32 can reach the charging port 20 without undue tension on the charger cable 34. Further, the electrified vehicle 10 is not blocking access to the acceptable port location 42 or any other acceptable port location associated with any other charger assembly. If the charging port 20 were arranged adjacent a rear of the electrified vehicle 10, the electrified vehicle 10 may have needed to park rearwardly.

In one exemplary aspect of this disclosure, as the electrified vehicle 10 approaches the charging station 12, such as when the electrified vehicle is in position A, one of the transceivers 36A, 36B transmits to the electrified vehicle 10 a virtual map indicating the acceptable port locations 40, 42, any obstructions 46 adjacent the charging station 12, and the location(s) of any other electrified vehicles within the parking area 44. The virtual map may be readable by a navigation system of the electrified vehicle 10, and may include geofences. The virtual map may also indicate to the electrified vehicle 10 which of the acceptable port locations 40, 42 are unoccupied by other electrified vehicles, and are thus available to the electrified vehicle 10. The controller 24 of the electrified vehicle 10 can then use the virtual map and determine, based on other factors associated with the electrified vehicle 10, where and how the electrified vehicle 10 should park such that the electrified vehicle 10 parks in an acceptable parking position. For instance, the location of the charging port 20 on the electrified vehicle 10 is known and is stored on the controller 24. Further, the size and shape of the electrified vehicle 10 is known and is stored on the controller 24. With this and other possible information, the electrified vehicle 10 may drive, either autonomously using a self-driving system, such as an intelligent parking assist system, or manually by a human operator, to the acceptable parking position using both the virtual map and the known information pertaining to the electrified vehicle 10. In the example where the electrified vehicle 10 is driven by a human operator, the virtual map may be displayed on a windshield of the electrified vehicle 10 using a projector and/or augmented reality, or the virtual map may be displayed on another human-machine interface (HMI) of the vehicle, such as on a screen of a navigation system. The charger assembly 26 could also include a screen issuing instructions to the driver of the electrified vehicle 10, such as "turn left" or "pull forward," etc. In the example of FIG. 2, the electrified vehicle 10 merely drives straight forward from point A to the acceptable parking position. In other examples, the electrified vehicle 10 may need to make one or more turns from point A to the acceptable parking position, based on the location of the charging port 20 and the size/shape of the electrified vehicle 10, among other possible factors.

In the aforementioned example, the electrified vehicle 10 is provided with parking guidance by essentially downloading a virtual map associated with the charging station 12, and guides itself to an acceptable parking position using the navigation and or self-driving system of the electrified vehicle 10 using the virtual map. In another example, the charging station 12 is configured to provide parking guidance by communicating back and forth with the electrified vehicle 10 as the electrified vehicle 10 parks so as to more actively guide the electrified vehicle 10 into the acceptable parking position.

In an example, the electrified vehicle 10 communicates information to the charging station 12 regarding the location of the charging port 20 and the shape and size of the electrified vehicle 10. The charging station 12 may be able to derive this information by determining the make and model of the electrified vehicle 10. As the electrified vehicle 10 moves from point A toward the charger assembly 26, the transceivers 36A, 36B are configured to send and receive signals relative to the transceivers 22A-22H as the electrified vehicle 10. The locations of the transceivers 36A, 36B are known relative to the acceptable port location 40. Further, the locations of the transceivers 22A-22H are known relative to the charging port 20 and the body of the electrified vehicle 10. The signals exchanged between the transceivers 22A-22H, 36A, 36B are used to determine the relative distances between the transceivers 22A-22H, 36A, 36B, and in turn the orientation and location of the electrified vehicle 10. These signals may be used by the electrified vehicle 10 to maneuver the electrified vehicle 10 into the acceptable parking position autonomously, without input from a human driver, using the self-driving system of the electrified vehicle 10. The location and orientation of the electrified vehicle 10 may be determined using time-of-flight, angle-of-arrival, or RSSI-based measurements, which may be performed by the controller 24 and/or the controller 38, for example. The location of the electrified vehicle 10 may be determined using other techniques, such as other radiolocation techniques.

While discussed separately, the exchange of signals between the transceivers 22A-22H, 36A, 36B could be combined with the use of the virtual map. In other words, the electrified vehicle 10 could attempt to move to the acceptable parking position using the virtual map, and the actual location and orientation of the electrified vehicle 10 could be confirmed and adjusted, if necessary, based on the signals exchanged between the transceivers 22A-22H, 36A, 36B.

Figure 3:
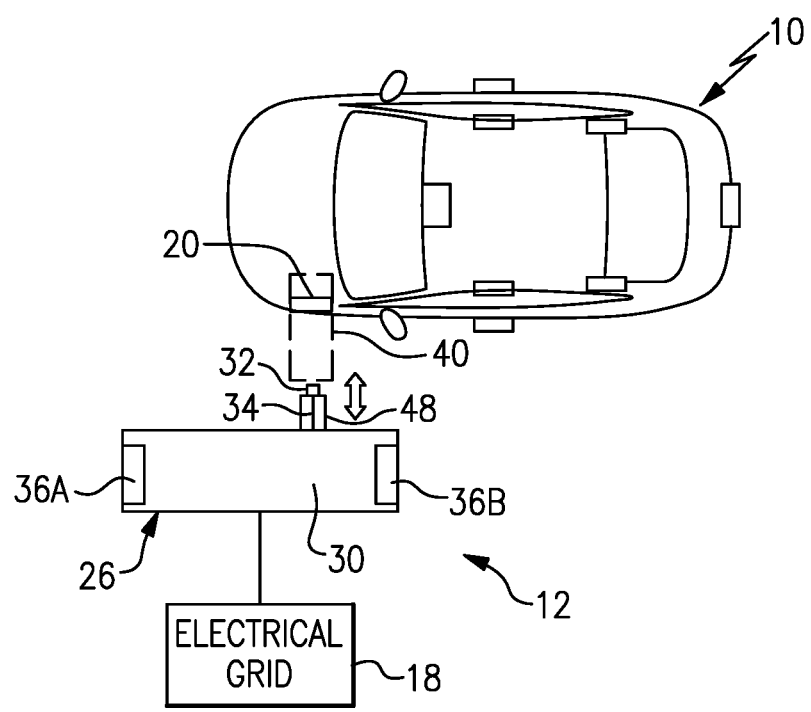
FIG. 3 is a top view of another electrified vehicle in an acceptable parking position relative to another electrified vehicle charging station, which includes a charger assembly having a plug supported on a moveable arm.

In another aspect of this disclosure, as shown in FIG. 3, the charger assembly 26 includes a moveable arm 48 supporting the plug 32 at a distal end thereof. The moveable arm 48 is moveable via an actuator assembly including one or more actuators. The charger cable 34 is routed within, or adjacent, the moveable arm 48. In an example, the moveable arm 48 is configured to adjust a relative position of the plug 32 in only two dimensions. In particular, the moveable arm 48 is configured to move the plug 32 vertically, by raising and lowering the plug 32 relative to a ground surface (i.e., in-and-out of the page relative to FIG. 3), and is further configured to translate the plug 32 linearly toward and away from the terminal 30 of the charger assembly 26 in a direction normal to the vertical direction and parallel to the ground surface (i.e., up-and-down relative to FIG. 3). While a moveable arm 48 having additional degrees of movement is possible, the relative horizontal position of the charging port 20 and the plug 32 can be adjusted, in this example, by moving the electrified vehicle 10. Thus, in this example, the moveable arm 48 is not moveable in a horizontal direction. The moveable arm 48 may include one or more sensors and be automatically moveable such that the plug 32 plugs into the charging port 20 when an electrified vehicle 10 is in an acceptable parking location. In FIG. 3, the electrified vehicle 10 may be guided into the acceptable parking position using the same techniques discussed above. The acceptable port location 40 of FIG. 3 is relatively narrow, however the electrified vehicle 10 is relatively easily moved into the acceptable parking position using one of the techniques discussed above relative to FIG. 2.

This disclosure, in particular the aspects of this disclosure that do not require a human operator of the electrified vehicle 10, can be used to maximize the efficiency of a charging station 12. In particular, when an electrified vehicle 10 reaches a sufficient state of charge, the charging station 12 can cooperate with that particular electrified vehicle 10 to guide to another location, and to then guide a waiting electrified vehicle into an acceptable parking position where it can be charged. In this way, the charging station 12 can use the self-driving systems of electrified vehicles to automatically, and without any user input, shuffle electrified vehicles efficiently between charger assemblies.

It should be understood that terms such as "about" and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle charging station, comprising:
a charger assembly including a plug connected to a terminal via a charger cable; and
a transceiver configured to communicate information to an electrified vehicle which is useable to guide the electrified vehicle to an acceptable parking position, wherein the acceptable parking position is a location and orientation of the electrified vehicle in which the plug can reach a charging port of the electrified vehicle and in which the electrified vehicle does not block access to any other charger assemblies of the electrified vehicle charging station, and wherein the information includes a virtual map indicating an acceptable port location where the plug can reach.

2. The electrified vehicle charging station as recited in claim 1, wherein the plug is configured to receive power from an external power source and deliver power to a battery pack of the electrified vehicle via the charging port.

3. An electrified vehicle charging station, comprising:
a charger assembly including a plug connected to a terminal via a charger cable; and
a transceiver configured to communicate information to an electrified vehicle which is useable to guide the electrified vehicle to an acceptable parking position, wherein the acceptable parking position is a position in which the plug will reach a charging port of the electrified vehicle, and wherein the information includes a virtual map indicating an acceptable port location.

4. The electrified vehicle charging station as recited in claim 3, wherein the acceptable port location is based on a length of the charger cable.

5. The electrified vehicle charging station as recited in claim 4, wherein the acceptable parking position is determined by comparing the location of the charging port on the electrified vehicle, the size and shape of the electrified vehicle, and the acceptable port location.

6. The electrified vehicle charging station as recited in claim 3, wherein the virtual map includes a location of a fixed obstruction adjacent the charger assembly, a location of a temporary obstruction adjacent the charger assembly. and a location of another vehicle adjacent the charger assembly.

7. The electrified vehicle charging station as recited in claim 1, wherein the transceiver is configured to send and receive information relative to the electrified vehicle such that the electrified vehicle can autonomously maneuver to the acceptable parking position.

8. The electrified vehicle charging station as recited in claim 7, wherein the transceiver is configured to send and receive information relative to a plurality of transceivers of the electrified vehicle.

9. The electrified vehicle charging station as recited in claim 8, wherein the plurality of transceivers of the electrified vehicle include transceivers of a passive entry system of the electrified vehicle.

10. The electrified vehicle charging station as recited in claim 7, wherein a current location of the electrified vehicle is determined using at least one of time-of-flight, angle-of-arrival, or RSSI-based measurements.

11. The electrified vehicle charging station as recited in claim 1, wherein the charger assembly includes a movable arm supporting the plug and configured to move the plug relative to the charging port.

12. The electrified vehicle charging station as recited in claim 11, wherein:
the moveable arm is configured to move in a vertical direction perpendicular to a ground surface,
the moveable arm also translatable in a direction perpendicular to the vertical direction toward and away from the charging port, and
the moveable arm is not moveable in a horizontal direction.

13. The electrified vehicle charging station as recited in claim 1, further comprising a controller configured to receive information from components of the electrified vehicle charging station and configured to issue commands to components of the electrified vehicle charging station.

14. The electrified vehicle charging station as recited in claim 1, wherein:
the electrified vehicle is one of a battery electric vehicle and a plug-in hybrid electric vehicle, and
the electrified vehicle includes a battery pack configured to output electrical power to an electric machine.

15. A method, comprising:
communicating information to an electrified vehicle using a transceiver of an electrified vehicle charging station, wherein the information is useable to guide the electrified vehicle to an acceptable parking position, wherein the acceptable parking position is a position in which a plug of the electrified vehicle charging station will reach a charging port of the electrified vehicle, wherein the information includes a virtual map indicating an acceptable port location where the plug can reachthe.

16. The method as recited in claim 15, further comprising:
autonomously maneuvering the electrified vehicle to the acceptable parking position using the information.

17. The method as recited in claim 16, wherein the autonomously maneuvering step includes receiving information from a transceiver of the electrified vehicle regarding a location and orientation of the electrified vehicle.

18. The method as recited in claim 15, further comprising:
when the electrified vehicle is parked in the acceptable parking position, plugging the plug into the charging port either manually or using a moveable arm.

19. The electrified vehicle charging station as recited in claim 3, wherein the acceptable port location is a three dimensional space adjacent the terminal where the plug can reach.

20. The method as recited in claim 15, wherein the acceptable port location is a three dimensional space adjacent a terminal of the electrified vehicle charging station.

* * * * *